(12) United States Patent
Chang et al.

(10) Patent No.: US 6,395,828 B1
(45) Date of Patent: May 28, 2002

(54) LOW GLOSS ASA RESIN

(75) Inventors: Moh-Ching Oliver Chang, Wexford, PA (US); Allen R. Padwa, Worcester, MA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/965,711

(22) Filed: Sep. 26, 2001

(51) Int. Cl.$^7$ .................... C08L 63/00; C08G 63/02
(52) U.S. Cl. ................ 525/65; 525/66; 525/69; 525/113; 525/194; 525/227; 525/230; 525/240
(58) Field of Search ................... 525/65, 66, 69, 525/113, 194, 227, 230, 240

(56) References Cited

U.S. PATENT DOCUMENTS

| | | | |
|---|---|---|---|
| 4,460,742 A | 7/1984 | Kishida et al. | 525/64 |
| 4,894,416 A | 1/1990 | Gallucci | 525/74 |
| 5,369,172 A * | 11/1994 | Morgan et al. | 525/67 |
| 5,580,924 A | 12/1996 | Wildi et al. | 525/65 |

* cited by examiner

Primary Examiner—Jeffrey Mullis
(74) Attorney, Agent, or Firm—Joseph C. Gil; Aron Preis

(57) ABSTRACT

A thermoplastic molding composition comprising a grafted acrylate rubber (ASA) and a gloss reducing agent and a process for making the same are disclosed. The gloss reducing agent is the reaction product of (i) a compound having two or more epoxy groups per molecule and (ii) a compound having two or more amine groups per molecule, with the proviso that the total of epoxy groups of (i) and amine groups of (ii) per molecule is greater than 4. The gloss reducing agent may be either incorporated in ASA as the reaction product of (i) and (ii) or, in the alternative, formed upon the reaction of (i) with (ii) in the course of the thermal processing of the a blend containing ASA, (i) and (ii).

22 Claims, No Drawings

LOW GLOSS ASA RESIN

FIELD OF THE INVENTION

This invention relates to thermoplastic molding compositions and more particularly to a blend containing an acrylate-styrene-acrylonitrile interpolymer (ASA resin) and a gloss-reducing agent.

SUMMARY OF THE INVENTION

A thermoplastic molding composition comprising a grafted acrylate rubber (ASA) and a gloss reducing agent and a process for making the same are disclosed. The gloss reducing agent is the reaction product of (i) a compound having two or more epoxy groups per molecule and (ii) a compound having two or more amine groups per molecule, with the proviso that the total of epoxy groups of (i) and amine groups of (ii) per molecule is greater than 4. The gloss reducing agent may be either incorporated in ASA as the reaction product of (i) and (ii) or, in the alternative, formed upon the reaction of (i) with (ii) in the course of the thermal processing of the a blend containing ASA, (i) and (ii).

DESCRIPTION OF THE PRIOR ART

Products prepared of thermoplastic molding compositions are often times glossy, yet for some applications this is not a desirable property. There is considerable need for low-gloss compositions especially in applications such as computer housings, keyboards, appliances and automotive parts.

Elimination of gloss by surface embossing has been practiced but requires a separate step and adds cost, Moreover, subsequent abrasion may remove the embossed matte surface and cause the gloss to reappear. Addition of a finely-divided filler, such as silica, silicate or aluminate or other similarly inert minerals has been demonstrated to reduce the gloss of thermoplastic molding compositions yet this is often accompanied by an undesirable reduction in the level of at least some physical and/or mechanical properties of the molded article, most notably the impact strength. In addition to the adverse effect on the impact strength, there is often a corresponding decline of the heat distortion temperature, decline in the weld line strength, deficient weathering and light stability, as well as other important properties.

The addition of a copolymer crosslinked by means of allyl functionality for obtaining a low gloss composition has been described in U.S. Pat. No. 4,460,742. U.S. Pat. No. 4,894,416 disclosed a low gloss thermoplastic with good physical properties consisting of a blend of ASA and a gloss-reducing amount of a glycidyl (meth)acrylate copolymer. U.S. Pat. No. 5,580,924 disclosed reduced gloss thermoplastic compositions entailing compounding a styrene-acrylonitrile copolymer (SAN) in the presence of an electrophilic reagent and an acid to form a gel, and then compounding the resultant gels with polycarbonate, SAN and ABS graft polymer to form an PC/ABS/SAN composition having reduced gloss.

Acrylonitrile-styrene-acrylate interpolymers (hereinafter referred to as ASA resins) are well known in the art, and have many favorable features such as good strength and outstanding weathering resistance. Attempts to reduce the high gloss of these resins met with the disadvantages that were discussed above. It is, therefore, desired to reduce the gloss of ASA resins while at the same time retaining the level of their mechanical properties.

DETAILED DESCRIPTION OF THE INVENTION

The composition of the invention comprises a blend of:
(a) 85 to 99.5, preferably 88 to 97, most preferably 90 to 95% of an ASA resin; and
(b) 0.5 to 15, preferably 3 to 12, most preferably 5 to 10% of the gloss-reducing agent, the percents being relative to the weight of the composition.

It has been found that such composition provides substantial reduction in gloss while retaining desirable physical properties such as impact strength, tensile strength as well as good thermal properties.

Component (a), the ASA resin (acrylate-styrene-acrylonitrile interpolymer), is known as an impact-modified, substantially-thermoplastic resin which comprises a SAN matrix in which is dispersed a grafted acrylate elastomer phase as impact modifier. Advantageous ASA resins which are commercially available comprise a crosslinked (meth) acrylate elastomer, a crosslinked SAN copolymer and a substantially linear SAN copolymer. Methylated styrene such as a-methyl styrene or vinyltoluene may be used in place of all or part of the styrene.

The ASA resins may be prepared by a variety of known methods involving emulsion or bulk polymerization. The preferred resins of the ASA type are of core-shell structure; these structures are well known in the art and have been more fully disclosed in U.S. Pat. No. 3,944,631 that is incorporated herein by reference. The (meth)acrylate elastomer core portion of these resins may be composed of alkyl, aryl, or arylalkyl esters of acrylic or methacrylic acids. The core-shell portion of the resin may be prepared by a two-step process in which the (meth)acrylate elastomer core (which is often slightly crosslinked with polyfunctional vinyl compounds) is grafted with a thermoplastic shell of poly (methyl methacrylate), polystyrene, styrene-acrylonitrile copolymer, or similar vinyl polymers or copolymers. The core-shell structure is then blended with uncrosslinked polymer, such as poly(methyl methacrylate), polystyrene, styrene-acrylonitrile copolymer, or similar vinyl polymers or copolymers, to form ASA resin.

The most preferred ASA resins contains about 15 to about 85% of an uncrosslinked matrix of acrylonitrile-styrene copolymer polymerized and blended with a core-shell impact modifier, typically about 10 to 50% of a crosslinked (meth)acrylate elastomer core with about 5 to about 35% of a crosslinked styrene-acrylonitrile copolymer shell.

Suitable crosslinking agents include polyfunctional ethylenically unsaturated monomer, such as diallyl fumarate and diallyl maleate. The shell and core are believed to be linked by having interpenetrating molecular networks, and the term interpolymer is applied to such products having such networks.

Other ASA resins which may be advantageously used in the composition of the invention are the types disclosed in U.S. Pat. Nos. 3,655,824, 3,830,878, 3,991,009, 4,433,102, 4,442,263, and, 4,409,363 all of which are incorporated herein by reference. These ASA resins have in common the use of the three monomers, namely acrylate ester, styrene (or x-methylstyrene), and acrylonitrile, to make a thermoplastic with good impact, heat distortion and weathering characteristics. They differ principally in the method of manufacture and in the detailed structure of the essential rubbery phase and the interphases if any. As a class the ASA resins have relatively similar blending properties in view of their outer continuous phase of acrylonitrile-styrene copolymer.

The gloss reducing agent the present invention is the reaction product of (i) a compound having two or more epoxy groups per molecule with (ii) a compound having two or more terminal amine groups per molecule, with the proviso that the total of epoxy groups of (i) and amine groups of (ii) per molecule of the reaction product is greater than 4. The gloss reducing agent may, in the alternative be incorporated in the composition as the reactants in their pre-reacted form that in the course of the thermal processing of the composition form the gloss reducing agent.

The epoxy compound suitable in the context of the invention is a compound (including oligomers) having a number average molecular weight of at least 1500, that contains at least 2 epoxy functional groups per molecule and includes in its molecular structure elements derived from (a) at least one vinyl monomer that contains no epoxy functionalities and (b) at least one epoxy functional vinyl monomer.

Among the suitable vinyl monomers that are free of epoxy functionalities mention may be made of ethylene, propylene, styrene, acrylonitrile, (meth)acrylic acid ester, and vinyl acetate. The suitable epoxy functional vinyl monomers include glycidyl (meth)acrylate and alkyl glycidyl ethers. The molecular weight (number average molecular weight) of the suitable epoxy compound is at least 1500, and preferably 1500 to about 50,000, most preferably 18,000 to 25,000 g/mole. The epoxy compound contains at least 2 epoxy functional groups per molecule, preferably 2 to 20, most preferably 8 to 15 epoxy functional groups.

The preferred epoxy compounds are ethylene-glycidyl methacrylate copolymers and ethylene/methyl acrylate/glycidyl methacrylate terpolymer, each having molecular weights of 18,000 to 25,000 and 8 to 15 epoxy groups per molecule.

The suitable amine compound contains polyolefinic or polyether structural elements, and at least two terminal primary amine functional groups per molecule. The preferred structure contains at least one of polyethylene, polypropylene and polyether structural units, and the most preferred contains structural units of polypropylene oxide. The number average molecular weight of the suitable amine compound is generally, 500 to 10000, preferably 1000 to 8000, most preferably 4000 to 6000 and the compound contains at least 2, preferably 2 to 5 most preferably 3 to 4 terminal amine functional groups per molecule. Most preferred amine compound is polypropylene oxide having a molecular weight of 4000 to 6000 and containing 3 terminal primary amine functional groups per molecule.

Importantly, the total of the epoxy groups of the epoxy compound and the terminal primary amine functional groups of the amine compound is greater than 4.

The reaction for the preparation of the gloss reducing agent is well known and may be prepared by procedures that are known the art-skilled.

The gloss reducing agent may also be incorporated in the inventive composition as the pre-reacted reactants. In this embodiment of the invention the epoxy compound and the amine compounds are blended together with the ASA resin in sufficient amounts to result, under the thermoplastic processing conditions, in the formation of the reaction product.

An effective amount of the gloss reducing agent is generally in the range of 0.5 to 15%, preferably 3 to 12%, most preferably 5 to 10% relative to the weight of the composition (total weight of ASA and gloss reducing agent). Lesser amounts give inadequate gloss reduction, greater amounts are excessively costly and may adversely affect physical properties of the blend or molded articles made therefrom.

The inventive composition may be modified by the addition of additives for their art-recognized function. Such additives include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The preparation of the inventive composition may be carried out by blending the ASA resin with the pre-prepared reaction product or, in the alternative, with the pre-reacted reactants that react in the course of the thermoplastic processing of the composition to form the gloss reducing agent. The blending, in either embodiment of the invention may be carried out by conventional means and following procedures that are well known to the art-skilled. Blending or kneading may be carried out by machines such as a Banbury mixer or an extruder, or in the alternative by solvent blending. The sequence of addition is not critical but the components should be thoroughly blended together and under time and temperature conditions conducive for the reaction to be completed.

The invention will be better understood with reference to the following examples, which are presented for purposes of illustration rather than for limitation, and which set forth the best mode contemplated for carrying out the invention.

EXAMPLES

The properties of the exemplified compositions were determined as noted below:

MFI—the melt flow index, in g/10 min. is the melt flow index that was determined according to ASTM D1238, under load of 10 kg at 220° C.;

MMP—is the required molding pressure to fill 99% of the mold cavity, indicated in psi, was determined at 490° F.

Vicat—is the softening temperature (1 Kg), ° C. determined according to ASTM D1525. The temperature of the oil increased at a rate of 2° C./minute.

DTUL—is the deflection temperature under load (264 psi (1.8 MPa)), ° C., determined according to ASTM D648. The temperature of the oil increased at a rate of 2° C./minute.

Izod (⅛" and ½") at room temperature (RT) and at the indicated lower temperature (−30° C.), in ft-lb/'in, was determined in accordance with ASTM D256. The samples measured 6.35 cm×1.27 cm×indicated thickness.

Tensile properties: determined at room temperature using an Instron universal machine with cross-head speed of 5 mm/minute in accordance with ASTM D-638. Type I tensile bars were used.

Gloss (20 deg) and Gloss (60 deg) were measured at room temperature in accordance with the procedure set forth in ASTM D523 using a Gardner gloss meter with 60 degree or 20 degree angle on molded plaques (dimension of 10.2 cm×7.6 cm×0.32 cm)

Flexural properties: determined at room temperature using an Instron universal machine with cross-head speed of 0.05 in/minute in accordance with ASTM D-790. The samples measured 6.35 cm×1.27 cm×3.18 cm.

In carrying out the following examples, the compositions were based on identical ASA material and contained, in addition to the gloss reducing agent, additive amounts of conventional additives that are irrelevant to the findings and are not critical to the invention. The ASA material in all the examples contained about 22% by weight of butyl acrylate rubber grafted with SAN (the weight ratio between rubber and the grafted SAN was about 100:80; the weight ratio between the styrene and Acrylonitrile was about 70/30). The gloss reducing agent in the exemplified composition comprised an epoxy compound and an amine compound in the indicated amounts, parts by weight per one hundred parts of resin. (pphr)

The epoxy compound designated as epoxy 1 was a copolymer of ethylene-glycidyl methacrylate (weight ratio of 92/8) having a molecular weight of about 20,000 g/mole.

The epoxy compound designated as epoxy 2 was a copolymer of ethylene-methyl acrylate-glycidyl methacrylate (weight ratio of 67/25/8) and having a molecular weight of about 18,000 g/mole.

The exemplified triamine compound was a primary poly (propylene oxide)triamine of approximately 5000 g/mole molecular weight.

The exemplified diamine compound was a primary poly (propylene oxide)diamine of approximately 2000 g/mole molecular weight.

The ASA that was used in the exemplified compositions was a blend of butyl acrylate rubber having a bimodal particle size distribution of 0.4 microns and 0.15 microns. Both modes comprise styrene-acrylonitrile copolymer grafted onto a core-shell structured rubber substrate. The core contains styrene and the shell is crosslinked poly(butyl acrylate).

TABLE 1

|  | A-0 | A-1 | A-2 | A-3 |
|---|---|---|---|---|
| Epoxy 2 | 0.0 | 3.0 | 3.0 | 3.0 |
| triamine | 0.0 | 0.0 | 0.0 | 5.0 |
| diamine | 0.0 | 0.0 | 3.0 | 0.0 |
| MMP, psi | 986 | 986 | 1073 | 1117 |
| MFI, g/10 min. | 4.0 | 1.4 | 1.2 | 0.8 |
| Gloss (20 deg) | 90 | 73 | 57 | 29 |
| Gloss (60 deg) | 96 | 91 | 83 | 69 |
| Impact Properties |  |  |  |  |
| Izod (1/8" at RT), ft-lb/' in | 2.9 | 2.1 | 1.5 | 1.3 |
| Izod (1/8" at −30 C.), ft-lb/' in | 0.7 | 0.6 | 0.5 | 0.5 |
| Izod (1/2" at RT), ft-lb/' in | 2.1 | 1.5 | 1.3 | 1.2 |
| Izod (1/2" at −30 C.), ft-lb/' in | 0.7 | 0.6 | 0.6 | 0.6 |
| Tensile Properties |  |  |  |  |
| Elongation, % | 80 | 33 | 34 | 29 |
| yield, MPa | 39 | 36 | 33 | 29 |
| break, MPa | 33 | 25 | 27 | 25 |
| modulus, GPa | 2.4 | 2.2 | 2.0 | 1.8 |
| DTUL, ° C. | 82.6 | 80.5 | 78.7 | 79.1 |
| Vicat, degree ° C. | 110.2 | 110.9 | 109.8 | 110.6 |
| Flexural properties |  |  |  |  |
| Yield stress, MPa | 69 | 64 | 56 | 50 |
| Modulus, GPa | 2.4 | 2.2 | 2.0 | 1.9 |

In a second set of experiments the results of which are summarized below the epoxy compound was "epoxy 1". The components of the exemplified compositions are identical to the ones used above.

|  | B-0 | B-1 | B-2 |
|---|---|---|---|
| Epoxy 1 | 0.0 | 3.0 | 3.0 |
| Triamine | 0.0 | 0.0 | 5.0 |
| Diamine | 0.0 | 3.0 | 0.0 |
| MMP, psi | 986 | 1015 | 1015 |
| MFI, g/10 min. | 4.0 | 1.0 | 2.3 |
| Gloss (20 deg) | 90 | 48 | 43 |
| Gloss (60 deg) | 96 | 85 | 72 |
| Impact Properties |  |  |  |
| Izod (1/8" at RT), ft-lb/' in | 2.9 | 1.7 | 1.5 |
| Izod (1/8" at −30 C.), ft-lb/' in | 0.7 | 0.6 | 0.4 |
| Izod (1/2" at RT), ft-lb/' in | 2.1 | 1.3 | 1.2 |
| Izod (1/2" at −30 C.), ft-lb/' in | 0.7 | 0.7 | 0.6 |
| Tensile Properties |  |  |  |
| Elongation, % | 80 | 59 | 22 |
| yield, MPa | 39 | 36 | 31 |
| break, MPa | 33 | 32 | 25 |
| modulus, GPa | 2.4 | 2.2 | 2.1 |
| DTUL, 264 psi (1.8 MPa), deg. C. | 82.6 | 80.8 | 80.6 |
| Vicat (1 Kg), degree C. | 110.2 | 111.0 | 110.0 |
| Flexural properties |  |  |  |
| Yield stress, MPa | 69 | 65 | 55 |
| Modulus, GPa | 2.4 | 2.2 | 2.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a grafted acrylate rubber and a gloss reducing agent that includes the reaction product of (i) a compound having two or more epoxy functional groups per molecule and having a number average molecular weight greater than 1500 with (ii) a compound having a number average molecular weight 500 to 10000 that contains polyolefinic or polyether structural units and at least two terminal primary amine functional groups per molecule, with the proviso that the total of epoxy functional groups of (i) and terminal amine groups of (ii) per molecule of agent is greater than 4, said agent being present in an amount of 0.5 to 15 percent relative to the weight of the composition.

2. The thermoplastic molding composition of claim 1 wherein said agent is present in an amount of 3 to 12 percent.

3. The thermoplastic molding composition of claim 1 wherein said agent is present in an amount of 5 to 10 percent.

4. The thermoplastic molding composition of claim 1 wherein said epoxy compound has a number average molecular weight of at least 1500.

5. The thermoplastic molding composition of claim 1 wherein said epoxy compound includes in its molecular structure elements derived from (a) at least one vinyl monomer that contains no epoxy functionalities and (b) at least one epoxy functional vinyl monomer.

6. The thermoplastic molding composition of claim 5 wherein elements derived from vinyl monomer that contain no epoxy functionalities are selected from the group consisting of ethylene, propylene, styrene, acrylonitrile, (meth) acrylic acid ester, and vinyl acetate.

7. The thermoplastic molding composition of claim 5 wherein elements derived from epoxy functional vinyl monomers are selected from the group consisting of glycidyl (meth)acrylate and alkyl glycidyl ethers.

8. The thermoplastic molding composition of claim 1 wherein compound having two or more epoxy functional groups per molecule has a number average molecular weight of 1500 to about 50,000.

9. The thermoplastic molding composition of claim 1 wherein compound having two or more epoxy functional groups per molecule has a number average molecular weight of 18,000 to 25,000 g/mole.

10. The thermoplastic molding composition of claim 1 wherein said (i) has 2 to 20 epoxy functional groups per molecule.

11. The thermoplastic molding composition of claim 1 wherein said (i) has 8 to 15 epoxy functional groups per molecule.

12. The thermoplastic molding composition of claim 1 wherein said (i) is a member selected from the group consisting of ethylene-glycidyl methacrylate copolymers and ethylene/methyl acrylate/glycidyl methacrylate terpolymer each having molecular weights of 18,000 to 25,000 and 8 to 15 epoxy groups per molecule.

13. The thermoplastic molding composition of claim 1 wherein polyolefinic structural elements of said (ii) are derived from polyethylene or polypropylene.

14. The thermoplastic molding composition of claim 1 wherein polyolefinic structural units of said (ii) are derived from polyether.

15. The thermoplastic molding composition of claim 1 wherein polyolefinic structural units of said (ii) are derived from polypropylene oxide.

16. The thermoplastic molding composition of claim 1 wherein molecular weight of said (ii) is 1000 to 8000.

17. The thermoplastic molding composition of claim 1 wherein molecular weight of said (ii) is 4000 to 6000.

18. The thermoplastic molding composition of claim 1 wherein said (ii) contains 2 to 5 terminal amine functional groups per molecule.

19. The thermoplastic molding composition of claim 1 wherein said (ii) contains 3 to 4 terminal amine functional groups per molecule.

20. The thermoplastic molding composition of claim 1 wherein said (ii) is polypropylene oxide having a molecular weight of 4000 to 6000 and containing 3 terminal primary amine functional groups per molecule.

21. A process for preparing a low-gloss thermoplastic molding composition comprising melt blending a grafted acrylate rubber and (i) a compound having two or more epoxy functional groups per molecule and having a number average molecular weight greater than 1500, and (ii) a compound having a number average molecular weight 500 to 10000 that contains polyolefinic or polyether structural units and at least two terminal primary amine functional groups per molecule, wherein the total of epoxy functional groups of (i) and terminal amine groups of (ii) is greater than 4, said melt blending being for a time and under thermal conditions sufficient to enable (i) to react with (ii) to form a reaction product, wherein the amount of said reaction product in the composition is 0.5 to 15 percent relative to the weight of the composition.

22. The composition prepared by the process of claim 21.

* * * * *